US011440634B2

(12) United States Patent
Arevalo Rodriguez et al.

(10) Patent No.: US 11,440,634 B2
(45) Date of Patent: Sep. 13, 2022

(54) FRAME FOR FUSELAGE SHELLS OF AN AIRCRAFT AND FUSELAGE SHELL

(71) Applicant: AIRBUS OPERATIONS S.L., Madrid (ES)

(72) Inventors: Elena Arevalo Rodriguez, Madrid (ES); Antonio Torres Esteban, Madrid (ES)

(73) Assignee: AIRBUS OPERATIONS S.L., Madrid (ES)

(*) Notice: Subject to any disclaimer, the term of this patent is extended or adjusted under 35 U.S.C. 154(b) by 351 days.

(21) Appl. No.: 16/521,057

(22) Filed: Jul. 24, 2019

(65) Prior Publication Data
US 2020/0108905 A1    Apr. 9, 2020

(30) Foreign Application Priority Data
Jul. 31, 2018   (EP) .................................... 18382579

(51) Int. Cl.
| *B64C 1/12* | (2006.01) |
| *B64C 1/06* | (2006.01) |
| *B64F 5/10* | (2017.01) |
| *B29L 31/30* | (2006.01) |
| *B64C 1/00* | (2006.01) |

(52) U.S. Cl.
CPC ................ *B64C 1/12* (2013.01); *B64C 1/068* (2013.01); *B29L 2031/3082* (2013.01); *B32B 2262/106* (2013.01); *B64C 1/064* (2013.01); *B64C 2001/0072* (2013.01); *B64F 5/10* (2017.01)

(58) Field of Classification Search
CPC ........... B64C 1/12; B64C 1/068; B64C 1/064; B64C 2001/0072; B64C 1/06; B64C 1/061; B29L 2031/3082; B32B 2262/106; B64F 5/10
See application file for complete search history.

(56) References Cited

U.S. PATENT DOCUMENTS

| 4,416,349 A | 11/1983 | Jacobs |
| 2004/0055248 A1 | 3/2004 | Grillos |
| 2006/0208135 A1* | 9/2006 | Liguore ............. B29D 99/0014 244/117 R |
| 2010/0327113 A1 | 12/2010 | Marquez Lppez et al. |
| 2012/0056037 A1 | 3/2012 | Dolzinki et al. |
| 2013/0115404 A1 | 5/2013 | Goehlich et al. |

FOREIGN PATENT DOCUMENTS

| DE | 10 2009 013 585 | 9/2010 |
| DE | 10 2009 048 748 | 4/2011 |
| EP | 2 431 175 | 3/2012 |
| WO | 2011/000987 | 1/2011 |

OTHER PUBLICATIONS

Extended European Search Report for 18382579.3 dated Jan. 16, 2019, 9 pages.

* cited by examiner

*Primary Examiner* — Brian Handville
(74) *Attorney, Agent, or Firm* — Nixon & Vanderhye P.C.

(57) ABSTRACT

A frame (1) for fuselage shells of an aircraft, the fuselage comprising a skin (3) and stringers (4), the frame (1) including: a plurality of sections (5), the sections (5) being separated by intermediate gaps corresponding to the position of the stringers (4) in the fuselage, each section (5) having a multi-cell configuration constituted by several modular elements (6) of composite material arranged in longitudinal direction, and a continuous inner cap (7) on top of the sections (5) and the intermediate gaps.

20 Claims, 5 Drawing Sheets

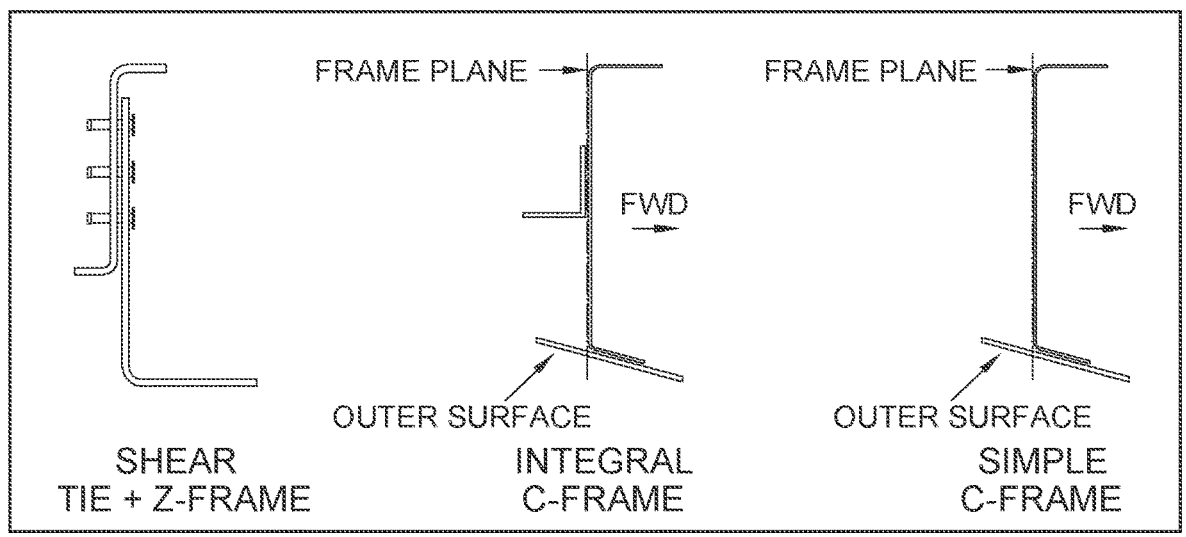
FIG. 1- PRIOR ART
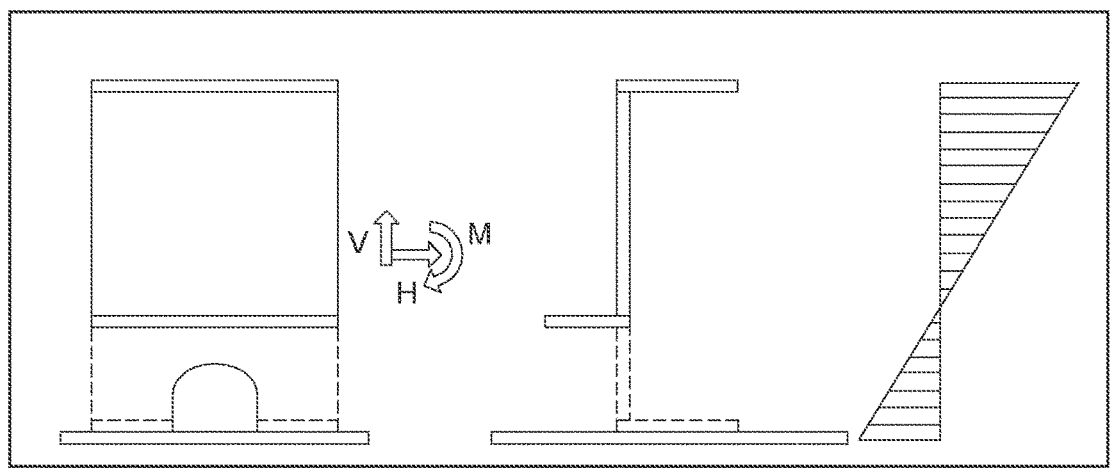
FIG. 2- PRIOR ART
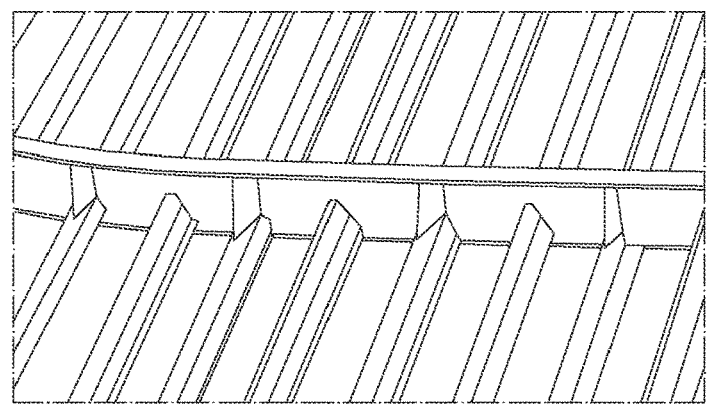
FIG. 3- PRIOR ART

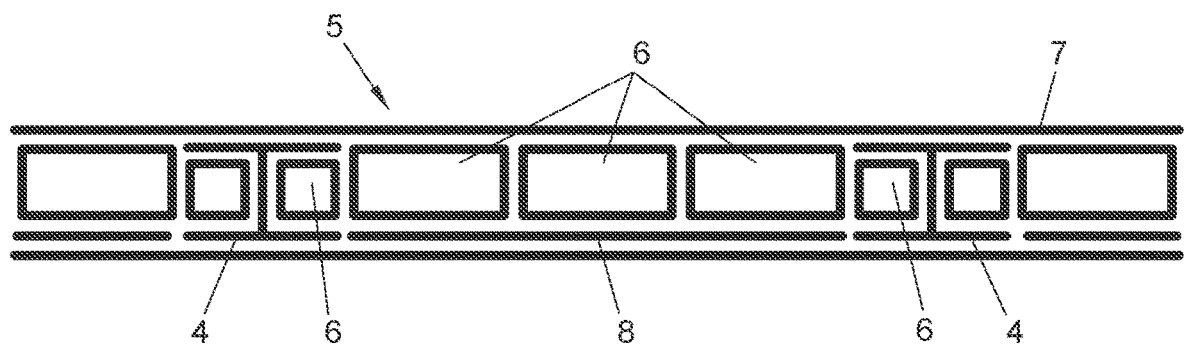
FIG. 11
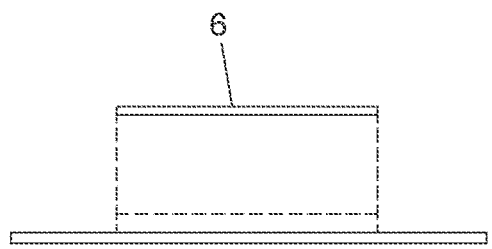 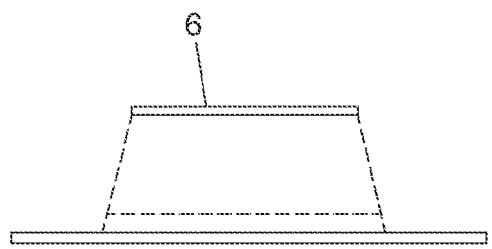
FIG. 12  FIG. 13

FRAME FOR FUSELAGE SHELLS OF AN AIRCRAFT AND FUSELAGE SHELL

RELATED APPLICATION

This application claims priority to European Patent Application 18382579-3 filed Jul. 31, 2018, the entirety of which is incorporated by reference.

FIELD OF THE INVENTION

This invention relates to fuselages in aircraft and particularly to a frame for a shell of a fuselage.

BACKGROUND

The main structures of pressurized and un-pressurized fuselages of an aircraft typically include a skin, stringers and frames. The skin forms an outer shell of the fuselage. The skin is stiffened by stringers oriented longitudinally with respect to the axis (X) of the fuselage. The stiffening provided by stringers allows for a reduction in the thickness of the skin which reduction saves weight on the aircraft. Frames are typically oriented in planes (Y-Z) perpendicular to the X-axis and stabilize the skin of the fuselage. The frames also support local loads within the fuselage, such as floors for passengers and cargo.

In addition, in open sections of the fuselage or in highly loaded areas of the fuselage, the structure of the fuselage further comprises structural elements of reinforcement, such as beams, which reinforce and stiffen these highly loaded areas.

Current aircraft fuselages include a skin with integrated stringers (co-bonded or co-cured in case of composite design), frames and reinforcing beams. The frames and beams are manufactured separately and riveted to the fuselage skin with the integrated stringers.

Current fuselage structures are configured as a single cell thin skinned tube with transverse frames and longitudinal stringers. The thin walled tube of a fuselage is essentially a beam structure and is subjected to bending, torsional and axial forces.

The rear of a fuselage may be configured a double curvature tapered skin. This section contains several cutouts and is subjected to large and concentrated forces from horizontal and vertical stabilizers attached to the rear of the fuselage.

Current fuselage shells generally have one of two types of frames which are differential frames (Z-shape frames with a shear tie) and integral frames (transversal sections having a C-shape, Z-shape or I-shape, each of which may include a circumferential stiffener).

Current frame sections have a web perpendicular or almost perpendicular to the skin near the frame, and inner and outer flanges perpendicular or almost perpendicular to the web. The outer flanges are riveted to the skin.

A main structural function of frames is to prevent general instabilities in the fuselage (contour frames). Frames are sometimes adapted to withstand local loads introductions (high loaded frames).

Contour frames have a plurality of cleats along their whole length to prevent lateral instability of the frame. These cleats are riveted to the frame web and to stringers. Riveting the cleats is a complex operation that increases the assembly cost of a fuselage shell.

WO 2011/000987 A1 describes a reinforcing frame for an aircraft fuselage, the frame comprising a structural member and a closed, internally hollow honeycomb member, the structural member comprising a lower base which is arranged on the inner face of the skin of the fuselage, and through which the stringers connecting the frames to the rest of the structure of the fuselage pass, and upper reinforcing members on which the mentioned honeycomb members are arranged, such that the honeycomb members increase the inertia and the stiffness of the frame without adding weight thereto, the frame having high stiffness in the trans-verse direction, in addition to being intrinsically stable to local buckling.

US 2013/0115404 A1 describes a lightweight structure, particularly a primary aircraft structure or a subassembly, as well as to a method for the manufacture thereof. A lightweight structure is at least sectionally composed of a plurality of connected mosaic elements and/or skin mosaic elements. The lightweight structure allows an essentially load-appropriate arrangement of the mosaic elements and/or the skin mosaic elements including the optional skin. The light-weight structure allows for a requires a significantly reduced number of connecting elements, such that the assembly effort can be reduced and an additional weight reduction can be achieved. Also, two variations of a method for manufacturing a lightweight structure are provided. Large-format lightweight structures such as, for example, an aircraft fuselage cell or partial shells thereof can also be manufactured in a reliable and dimensionally accurate fashion because only mosaic elements and skin mosaic elements, with relatively small dimensions, need to be handled. Other applications of the lightweight structure include launch vehicles, rocket stages, space stations, space station modules, satellites and masts or towers of wind power plants.

Many of the prior art configurations have drawbacks including:

Complex manufacturing process and tooling are needed to integrate contour frames together with the skin and stringers in a one shot manufacturing process (for compo-site thermoset material application). For this reason, in prior art configurations, contour frames are usually riveted in a subsequent assembly phase, which has an impact on cost.

Several cleats are needed to stabilize the contour frame, which means assembly time and therefore cost.

Complex tolerance management between fuselage shells (for example between the upper and lower fuselage shells), because of the connection of the webs of the frames in YZ plane.

Contour frames must be divided in different sectors in order to make the frame assembly feasible. A joint between these sectors is needed (coupling), which is carried out by means of different pieces which connect both frame sectors (inner flange, web and middle flange when the latter exists). All these coupling pieces and their subsequent assembly operations entail an important cost impact.

SUMMARY OF THE INVENTION

The invention may be embodied to provide a frame for fuselage shells of an aircraft that that may be embodied to overcome some or all of the drawbacks in the prior art frames.

The invention provides a frame for fuselage shells of an aircraft, the fuselage comprising a skin and stringers, the frame comprising:

(i) a plurality of sections separated by intermediate gaps corresponding to the position of the stringers in the fuselage.

Each section having a multi-cell configuration formed by modular elements of composite material oriented in a longitudinal direction, and (ii) a continuous inner cap on top of the sections and the intermediate gaps.

The described configuration of the frame for fuselage shells of an aircraft of the invention provide advantages including:

A conventional web in YZ plane is replaced by a multi-cell configuration wherein each of the modular elements forming the cells is oriented in a longitudinal direction. Replacing a conventional web the multi-cell frame configuration of the invention reduces the complexity in tooling and manufacturing process of a fuselage.

There need be no stabilization cleats in frames, as the new frame configuration makes them unnecessary.

Cost reduction because of reduction of assembly operations.

A frame coupling may not be needed.

A fuselage shell without rivets is achieved by forming the whole fuselage shell in a one-shot manufacturing process in which skin, stringers and frames are formed, e.g., cured, together.

Module standardization is possible which provides benefits in reduced module cost and fewer modules needed for assembly.

Easier tolerance management in the X-direction. If the fuselage section is split in shells, in the areas where the shells must be connected, it is needed to join the inner caps only (which act as inner flanges of the frame; see FIG. 4).

BRIEF DESCRIPTION OF DRAWINGS

Other characteristics and advantages of the present invention will be clear from the following detailed description of several embodiments illustrative of its object in relation to the attached figures.

FIG. 1 shows configurations of prior art frames.

FIG. 2 shows load distributions in the prior art frames shown in FIG. 1.

FIG. 3 shows a prior art frame with cleats riveted to the frame web and to the stringers.

FIGS. 7 to 11 show embodiments of sections of the frame of the invention.

FIG. 12 shows the transversal section constant in width of a frame of the invention.

FIG. 13 shows the transversal section variable in width of a frame of the invention.

DETAILED DESCRIPTION

FIG. 1 shows typical configurations of prior art frames already described, and FIG. 2 shows the load distribution in prior art frames.

This invention refers mainly to contour frames. The typical loads carried by these structural elements are summarized in FIG. 2, wherein M refers to the Moment, V to the Vertical Load and H to the Horizontal Load.

FIG. 2 shows that the frames together with the skin act as curved beams, carrying mainly axial loads (in the circumferential direction) in the most extreme elements of the transversal section (skin and inner flanges), and the web withstanding shear loads mainly. The image on the right corresponds to the force diagram.

FIG. 3 shows a prior art frame with cleats riveted to the frame web and to the stringers.

Figure 4:
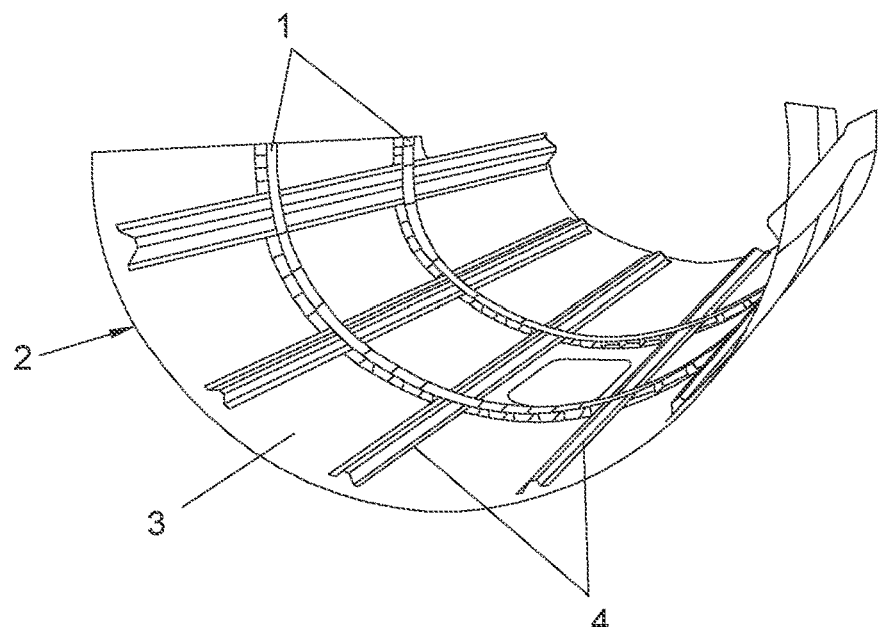
FIG. 4 shows an embodiment of a fuselage shell with frames according to the invention.

FIG. 4 shows an embodiment of a fuselage shell 2 with frames 1 embodying the invention. The fuselage shell 2 comprises a skin 3, longitudinal stringers 4 and transversal frames 1.

The frames 1 are joined to the inner face of the skin 3. The frames extend circumferentially around the fuselage. The frames may each be substantially aligned with a plane perpendicular to a longitudinal axis of the fuselage. Each frame may have a relatively narrow width along the longitudinal axis, as compared to the length of the stringer. For example, the width of the frame may be 1/10 or less the length of a stringer. In other embodiments, the width of the frame may be less than 5 feet, less than 3 feet and less than 1 foot.

The frames 1 in FIG. 4 have configurations according embodiments of the invention. FIGS. 5 to 11 and 14 show a cross sectional view of exemplary sections of frames. These figures show sections of a frame 1 assembled with the skin 3 and stringers 4 of the fuselage. The curvature of the frame section is not show in FIGS. 5 to 11 and 14 for purposes of illustration. In practice, each frame section may have a curvature along is length (in a direction perpendicular to the longitudinal axis of the fuselage which is the X-direction and in a plane of the YZ directions) wherein the curvature corresponds to the curvature of the skin of the fuselage to which the frame section is attached.

Figure 5:
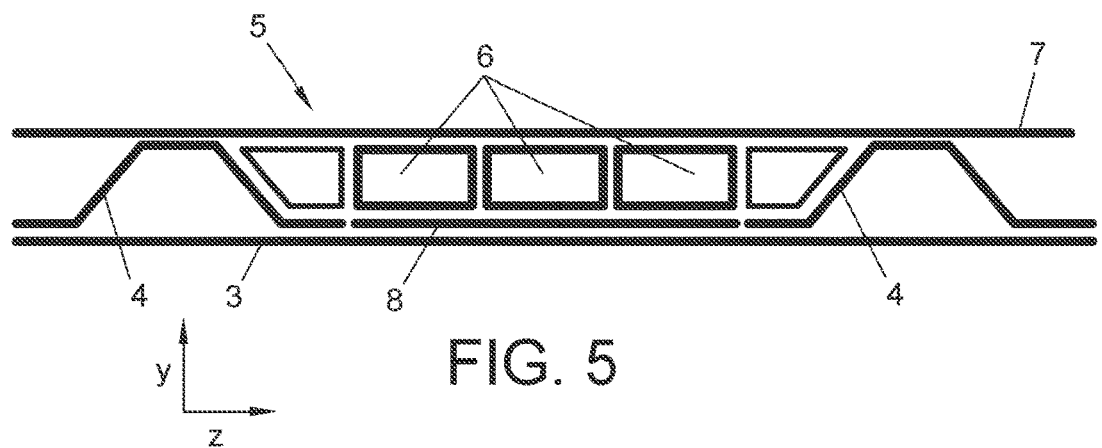
FIG. 5 shows a section of a frame of the invention, assembled with a skin and stringers.

The frames 1 shown in FIG. 4 comprise an annular array of sections 5 (like the one shown in FIG. 5). In a frame, the sections are arranged in an annular array with the stringers. A stringer may be between the ends of two sections on opposite sides of the stringer. The ends of the two sections are separated by an intermediate gap which corresponds to the stringer 4 between the ends.

Each section of a frame is a multi-cell assembly formed by modular elements 6 arranged side by side. Each of the modular elements may be formed of a composite material, such as a carbon fiber preform to be integrated into the fuselage during a curing process. The longitudinal axis of each of the modular elements may be parallel to the longitudinal axis (X-axis) of the fuselage. The length, along the X-axis, of each of the modular elements may be less than the width of the element. The height of the element may be shorter than the width and the length. The width of the modular element is in a direction perpendicular to the longitudinal axis and generally parallel to the skin. The height of the modular element is generally perpendicular to the longitudinal axis and perpendicular to the skin.

An inner cap 7 covers the top (radially inward most surface) of each of the sections 5 and the intermediate gaps. The inner cap 7 may be a continuous strap or may be straps integrated together to form an annular inner cap extending the entire inner perimeter of the frame.

The inner cap 7 may have a circumferential shape corresponding to a circumferential shape of the fuselage. The inner cap overlies the modular elements forming each of the sections 5 arranged between the stringers.

The modular elements 6 in the section 5 of the frame 1 can all have the same shape or, alternatively, some of them can have a different shape.

Figure 6:
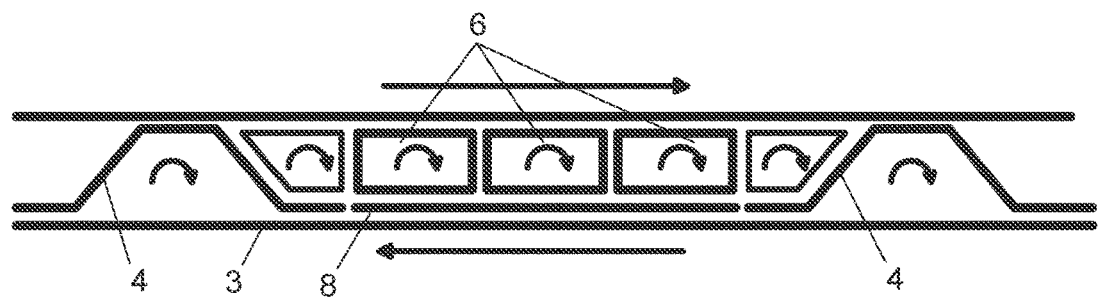
FIG. 6 shows the load distribution in the section of a frame of the invention.

As it can be seen in FIG. 6, the axial (circumferential) load is carried at least in part by the inner cap 7 and the skin 3. The inner cap 7 acts like an inner flange of the frame 1. The inner cap 7 and skin 3 are connected by the modular elements 6 or cells of the multi-cell section 5. The modular elements react and resist the moment in torsion, as FIG. 6 shows.

Multi-cells can be obtained by different preform elements including: C-shaped, tubes, omega-shaped, etc. FIGS. 7 to 10 show several embodiments of sections of the frame 1 of the invention, placed between two omega stringers, one on each side.

Figure 7:
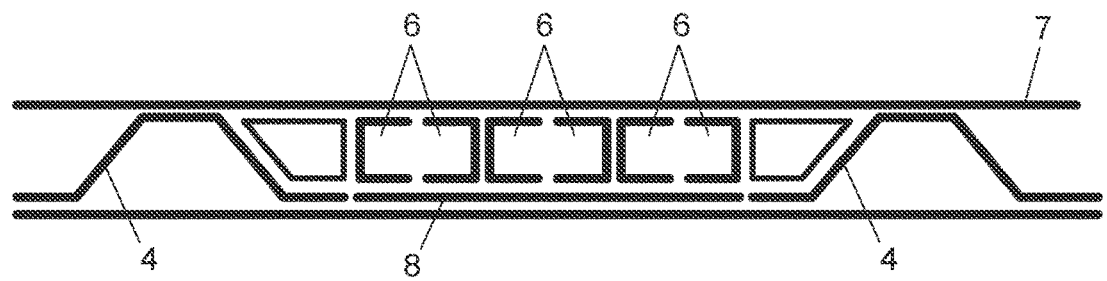

FIG. 7 includes several C-shaped modular elements 6.

Figure 8:
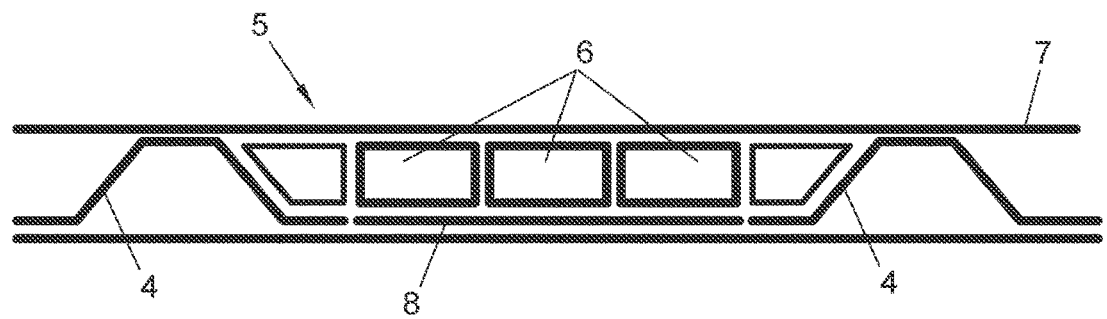

FIG. 8 includes several modular elements 6 with longitudinal section of rectangular shape (or tube shape).

Figure 9:
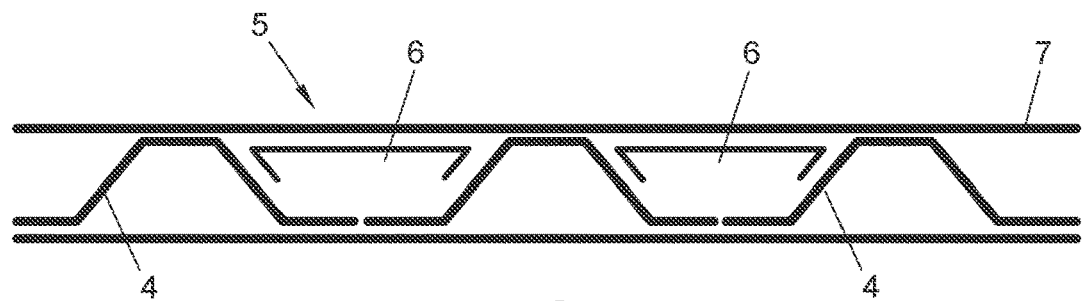

FIG. 9 includes some modular elements 6 with longitudinal section with the shape of an open polygonal line.

Figure 10:
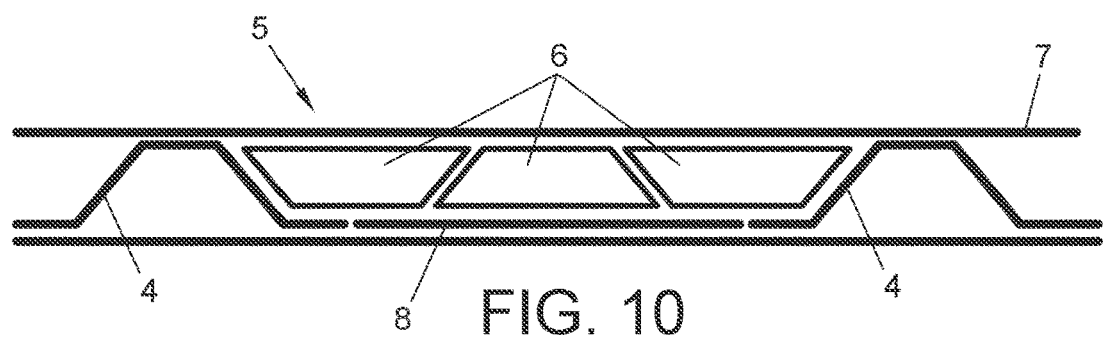

FIG. 10 includes several omega-shaped modular elements 6.

The modular elements, including those shown in FIGS. 7 to 10, may initially be carbon fiber preforms which are mounted to the skin and then impregnated with resin and cured with the skin.

FIG. 11 shows an embodiment of a section of the frame 1 of the invention, placed between two I stringers 4, one on each side. In this embodiment some of the modular elements 6 have rectangular shape and some have square shape.

As shown in FIGS. 12 and 13, the transversal section can be variable in width, so the design can be enlarged in some areas if it is required.

Figure 14:
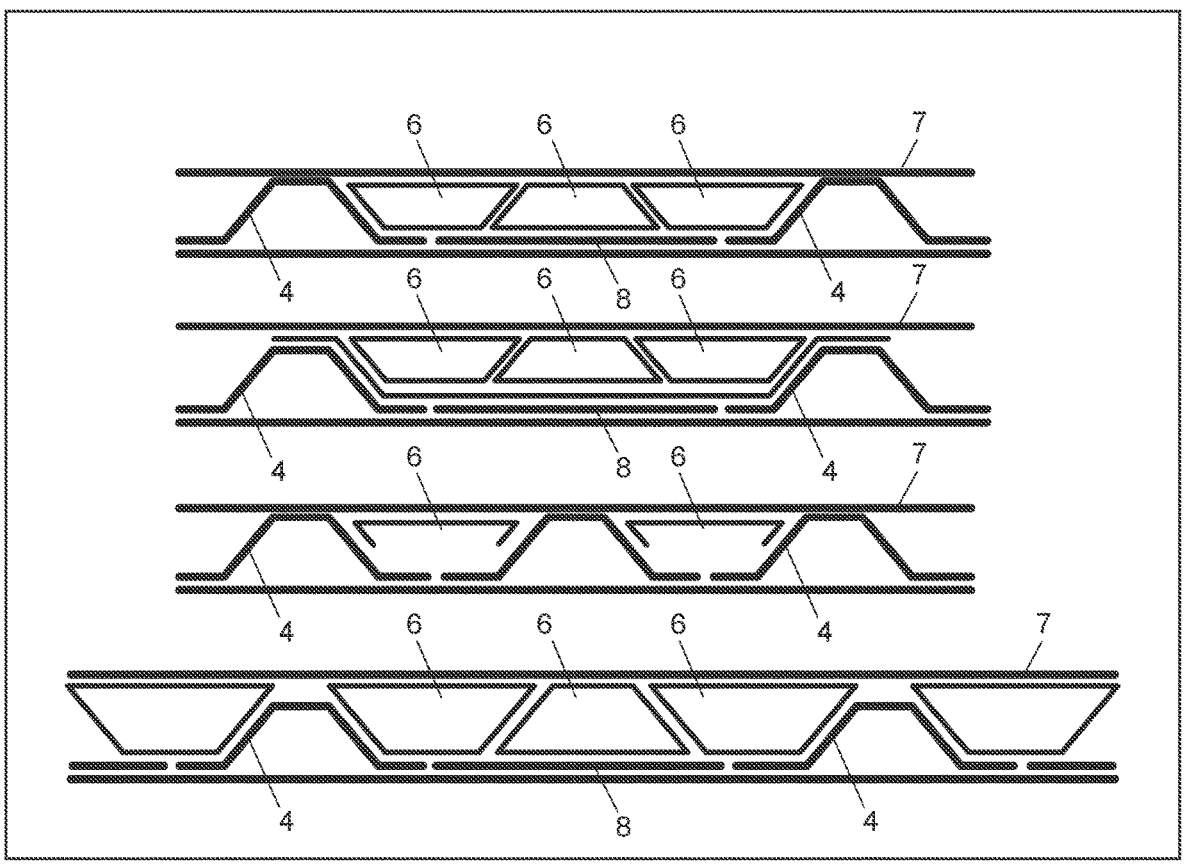
FIG. 14 shows examples of different connections between the stringers and the modular elements of the frame of the invention.

FIG. 14 shows examples of different types of connections between the stringers 4 and the modular elements 6 of the section of the frame 1.

The modular elements 6 are joined to adjacent elements 6 and to the inner cap 7 and the skin 3. The modular elements adjacent a stringer may also be jointed to the stringer. The radially outward surfaces of the modular elements 6 are connected to the skin 3 (directly or through the connecting element 8). The radially inward surfaces of the modular elements 6 are connected the inner cap 7. The webs of the modular elements between the radially outward and inner surfaces are joined to adjacent modular elements or to a stringer. The joints between the modular elements and the skin, stringers and inner cap as well as with adjacent modular elements may be co-cured or co-bonded to form an integrated, single-piece assembly of skin, stringers and frames including the modular elements and inner caps.

The modular elements 6 may be formed separately such as to form preforms of carbon fiber layers molded into the modular elements. The modular elements are then joined with the skin and stringers. The cap 7 is applied to the radial inner surfaces of the sections of the modular elements and the stringers. The assembly of the skin, stringers and frames of modular elements and inner cap are cured or bonded in a process to form the integrated, single piece fuselage section.

At least one section 5 of the frame 1 can additionally comprise a connecting element 8 between the modular elements 6 and the skin 3 of the fuselage shell 2. These connecting elements 8 can give continuity to the flanges of the stringers 4. In the embodiments of FIGS. 7 and 8 the connecting elements 8 can be removed, so that the modular elements 6 would be higher and could be in direct contact with the skin 3.

The standardization of the modular elements 6 (i.e., the possibility of having modular elements of the same size and shape) brings several advantages. For instance, it allows having a continuous surface between the stringers 4 in which to place the modular elements 6, which makes it easier to design and assemble them. For example, in FIG. 10 the modular elements 6 with omega section (trapezium section) can be mounted in the indicated arrangement to suit the space between the stringers 4.

The fuselage shell 2 for an aircraft according to the invention comprises a skin 3, longitudinal stringers 4 and transversal frames 1 (see FIG. 4). These frames 1 can be of any of the embodiments previously described.

Preferably, the skin 3, the stringers 4 and the frames 1 are made in a one-shot manufacturing process, forming a single piece. In this way the modular elements 6 and the inner cap 7 form a single piece with the skin 3 and the stringers 4, which is clearly advantageous over the prior art.

Although the present invention has been fully described in connection with preferred embodiments, it is evident that modifications may be introduced within the scope thereof, not considering this as limited by these embodiments, but by the contents of the following claims.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention is:

1. A frame configured for a fuselage of an aircraft, wherein the fuselage includes a skin and stringers; and the frame comprises:
    sections each of which includes a multi-cell configuration formed by modular elements of composite material arranged in longitudinal direction, wherein each of the modular elements have a length shorter than a width of the modular element;
    intermediate gaps corresponding to positions of the stringers in the fuselage and each separating at least two of the sections; and
    an inner cap on top of the sections and on top of the intermediate gaps.

2. The frame of claim 1, wherein the inner cap is a strap.

3. The frame of claim 2, wherein the strap has a circumferential shape.

4. The frame of claim 1, wherein the sections are modular elements each have the same shape.

5. The frame of claim 1, wherein the sections are each a rectangular longitudinal section.

6. The frame of claim 1, wherein the sections are each an omega-shaped longitudinal section.

7. The frame of claim 1, wherein at least one of the modular elements has a shape different than a shape of another one of the modular elements.

8. The frame of claim 1, wherein at least some of the modular elements each have a C-shaped cross-section.

9. The frame of claim 1, wherein the width of each of the modular elements is a constant width.

10. The frame of claim 1, wherein the width of at least some of the modular elements differ from the width of others of the modular elements.

11. The frame of claim 1, wherein at least one section additionally comprises a connecting element between the modular elements and the skin of the fuselage shell.

12. A fuselage shell for an aircraft comprising:
a skin forming extending continuously around a longitudinal axis of the fuselage shell,
stringers attached to an inside surface of the skin and oriented longitudinally;
frames attached to the inside surface of the skin and oriented transverse to the longitudinal axis, wherein each of the frames include:
modular elements oriented longitudinally, arranged side-by-side between adjacent ones of the stringers, connected to the inside surface of the skin and including inward facing surfaces opposite to the skin, wherein each of the modular elements have a length shorter than a width of the modular element; and
an inner cap oriented transverse to the longitudinal axis and covering the inward surfaces of the modular elements and the inward surfaces of the stringers.

13. The fuselage shell of claim 12, wherein the skin, the stringers and the frames are an integrated, single-piece assembly.

14. The fuselage shell of claim 12 wherein the length of each of the modular elements of one of the frames is uniform.

15. The fuselage shell of claim 12 wherein each of the modular elements have a height shorter than the length and the width of the modular element.

16. The fuselage shell of claim 12 wherein each of the modular elements have opposite sides and each of the sides is bonded or cured with the side of an adjacent one of the modular elements or with a side of an adjacent one of the stringers.

17. The fuselage shell of claim 12, wherein the stringers have adjacent sides and each of the sides of the stringers is bonded or cured with a side of one of the modular elements.

18. The fuselage shell of claim 12, wherein at least one of the frames includes a connecting strip sandwiched between the inside surface of the skin and the modular elements.

19. The fuselage shell of claim 12, wherein the inner cap is bonded or cured with the inward surfaces of the stringers.

20. The fuselage shell of claim 12, wherein the inner cap is a continuous strap extending around the longitudinal axis of the fuselage shell.

* * * * *